(12) United States Patent
Liu

(10) Patent No.: US 7,741,384 B2
(45) Date of Patent: Jun. 22, 2010

(54) ENCAPSULATION OF PIGMENT PARTICLES BY POLYMERIZATION

(75) Inventor: Hui Liu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 11/433,893

(22) Filed: May 11, 2006

(65) Prior Publication Data

US 2007/0265372 A1    Nov. 15, 2007

(51) Int. Cl.
*C09D 11/00* (2006.01)

(52) U.S. Cl. .................. 523/160; 523/202; 523/200; 523/333; 526/88; 526/89; 526/229; 106/31.6; 347/100

(58) Field of Classification Search ........... 523/160
See application file for complete search history.

(56) References Cited

U.S. PATENT DOCUMENTS

| | | | |
|---|---|---|---|
| 3,714,102 A | 1/1973 | Reiss | |
| 4,056,501 A | 11/1977 | Gibbs et al. | |
| 4,064,294 A | 12/1977 | Babil et al. | |
| 4,337,185 A | 6/1982 | Wessling et al. | |
| 4,677,003 A | 6/1987 | Redlich et al. | |
| 4,680,200 A | 7/1987 | Sole | |
| 4,851,318 A | 7/1989 | Hsieh et al. | |
| 4,885,320 A | 12/1989 | Biale | |
| 5,032,425 A | 7/1991 | Livsey et al. | |
| 5,035,970 A | 7/1991 | Hsieh et al. | |
| 5,139,915 A | 8/1992 | Moffat et al. | |
| 5,204,208 A | 4/1993 | Paine et al. | |
| 5,213,938 A | 5/1993 | Sacripante et al. | |
| 5,278,020 A | 1/1994 | Grushkin et al. | |
| 5,281,261 A * | 1/1994 | Lin | 106/31.65 |
| 5,521,253 A | 5/1996 | Lee et al. | |
| 5,604,076 A | 2/1997 | Patel et al. | |
| 5,741,591 A | 4/1998 | Tashiro et al. | |
| 5,852,073 A * | 12/1998 | Villiger et al. | 523/161 |
| 5,965,316 A | 10/1999 | Kmiecik-Lawrynowicz | |
| 5,990,202 A | 11/1999 | Nguyen et al. | |
| 6,043,319 A | 3/2000 | Lee et al. | |
| 6,127,083 A | 10/2000 | Nomura et al. | |
| 6,139,961 A | 10/2000 | Blankenship et al. | |
| 6,183,924 B1 | 2/2001 | Nomura et al. | |
| 6,203,957 B1 | 3/2001 | Nomura et al. | |

(Continued)

FOREIGN PATENT DOCUMENTS

EP    0209879 B1    1/1987

(Continued)

OTHER PUBLICATIONS

Tiarks et al. (Prog. Colloid Polym. Sci. (2001) 117:110-112).*

(Continued)

*Primary Examiner*—David Wu
*Assistant Examiner*—Vu Nguyen

(57) ABSTRACT

A method of preparing an ink includes homogenizing a dispersion to coat pigment particles in the dispersion with a monomer. An ink for use in a printing device includes pigment particles encapsulated in a polymerized monomer, where the monomer has a polarity that is higher than a polarity of a surface of the pigment particles.

20 Claims, 2 Drawing Sheets

U.S. PATENT DOCUMENTS

| | | | |
|---|---|---|---|
| 6,309,787 B1 | 10/2001 | Cheng | |
| 6,399,701 B1 | 6/2002 | Enright et al. | |
| 6,413,692 B1 | 7/2002 | Cheng | |
| 6,455,219 B1 * | 9/2002 | Chen et al. | 430/137.14 |
| 6,538,047 B1 | 3/2003 | Miyabayashi | |
| 6,602,333 B2 | 8/2003 | Miyabayashi | |
| 6,646,086 B2 | 11/2003 | Slone | |
| 6,767,090 B2 | 7/2004 | Yatake et al. | |
| 6,811,598 B1 | 11/2004 | Micale | |
| 6,818,684 B2 | 11/2004 | Slone | |
| 6,838,507 B2 | 1/2005 | Chou et al. | |
| 6,864,302 B2 | 3/2005 | Miyabayashi | |
| 7,307,109 B2 * | 12/2007 | Yatake et al. | 523/160 |
| 2003/0195274 A1 | 10/2003 | Nakamura et al. | |
| 2003/0225185 A1 | 12/2003 | Akers et al. | |
| 2004/0061753 A1 | 4/2004 | Chen et al. | |
| 2004/0116553 A1 * | 6/2004 | Nakamura et al. | 523/160 |
| 2004/0157956 A1 | 8/2004 | Vincent et al. | |
| 2004/0157958 A1 | 8/2004 | Vincent et al. | |
| 2004/0171718 A1 | 9/2004 | Nakamura et al. | |
| 2004/0179066 A1 * | 9/2004 | Arita et al. | 347/54 |
| 2004/0229974 A1 | 11/2004 | Miyabayashi | |
| 2005/0059769 A1 * | 3/2005 | Chou et al. | 524/445 |
| 2005/0065284 A1 | 3/2005 | Krishnan | |
| 2005/0075416 A1 | 4/2005 | Miyabayashi | |
| 2005/0176877 A1 | 8/2005 | Miyabayashi | |

FOREIGN PATENT DOCUMENTS

| | | |
|---|---|---|
| EP | 0528201 B1 | 2/1993 |
| EP | 0327199 B1 | 11/1993 |
| EP | 0505648 B1 | 6/1994 |
| EP | 0782475 B1 | 5/1996 |
| EP | 1077 238 A1 | 2/2001 |
| EP | 1077238 B1 | 2/2001 |
| EP | 1 085 061 A | 3/2001 |
| EP | 1 088 863 A | 4/2001 |
| EP | 1 264 867 A | 12/2002 |
| EP | 1270681 A | 1/2003 |
| EP | 1319671 A | 6/2003 |
| GB | 2056997 A | 3/1981 |
| GB | 2250103 A | 5/1992 |
| GB | 2266158 A | 10/1993 |
| JP | 62-181302 | 8/1987 |
| JP | 2005097518 A | 4/2005 |
| WO | WO 99/23182 | 5/1999 |
| WO | WO 2004/081222 A2 | 9/2004 |
| WO | WO 2005/105931 A1 | 11/2005 |
| WO | 2006/041658 A | 4/2006 |
| WO | 2007/094881 A | 8/2007 |

OTHER PUBLICATIONS

Viala, P., et al.; Pigment Encapsulation by Emulsion Polymerisation, Redispersible in Water; Macromalecular Symposia 02-23, 867964 NDN-131-0139-6086-2; 2002; pp. 651-661; (abstract only).

Erdem, B., et al.; Encapsulation of Inorganic Particles Via Miniemulsion Polymerization. I. Dispersion of Titanium Dioxide Particles in Organic Media Using OLOA 370 as Stabilizer; Journal of Polymer Science: Polymer Chemistry Edition, 20-01, 798160, NDN-131-0132-8649-0; Dec. 15, 2000; pp. 4419-4430; (abstract only).

Saito, N, et al; Effect of the addition of water-soluble polymeric species on the encapsulation of pigments by soap-free emulsion polymerisation; J. Jap. Soc. Col. Mat., 96-01, 421573,96/01573, NDN-138-0019-4046-7, vol. 68, No. 9; 1995; pp. 535-541 (abstract only).

Saito, N., et al.; Encapsulation of pigments by soap-free emulsion polymerisation of methyl methacrylate; J. Jap. Soc. Col. Mat., 93-04, 364065, 93/04065, NDN-138-0016-6873-8, vol. 65, No. 11; 1992; pp. 665-670 (abstract only).

Ann, S., et al.; Microencapsulation of Polymer Coated Color Pigments for Multi-Color Electrophoretic Display; Mater Res Soc Symp Proc, 04-13, E2004138077165, NDN-267-0461-7732-0, vol. 769; 2003; pp. 219-224; (abstract only).

Lelu, S., et al.; Encapsulation of an organic phthalocyanine blue pigment into polystyrene latex particles using a miniemulsion polymerisation process; Polym. Internat., vol. 52, No. 4; 2003; pp. 542-547; (abstract only).

Lelu et al.; "Encapsulation of an Organic Phthalocyanine Blue Pigment in to Polystyrene Latex Particles Using a Miniemulsion Polymerization Process", Polymer International; 52: 542-547 (2003).

Schork et al.; "Miniemulsion Polymerization"; Adv Polym Sci (2005 175; 129-255; DOI 10.1007/b100115; Springer-Verlag Berlin Heidelberg 2005.

Clariant; "Hostaperm Yellow H5G: A New Chromophore Solves Long-Pending Problems in Waterbased Automotive OEM Coatings"; Apr. 2001; pp. 1-9.

* cited by examiner

ENCAPSULATION OF PIGMENT PARTICLES BY POLYMERIZATION

BACKGROUND

Inkjet printing is a method for producing images by the selective deposition of ink droplets on a print medium, such as paper, film, fabric and other substrates. Digital data is provided to the print engine to drive the selective deposition of the ink droplets in a pattern that forms the desired image. Inkjet printing can be in color or monochromatic. Because of their many advantages, inkjet printers have found broad applications in such diverse fields as industrial labeling, short run printing, desktop publishing and pictorial printing.

The inks used in various ink jet printers can be classified as either dye-based or pigment-based. A dye is a colorant which is molecularly dispersed or dissolved in a carrier medium such that discrete colorant particles cannot be observed. The carrier medium can be a liquid or a solid at room temperature. In pigment-based inks, the colorant exists as discrete particles suspended in a carrier medium. These pigment particles are usually treated with dispersants or stabilizers which keep the pigment particles from agglomerating and/or settling out of suspension.

Ideally, the ink used in an inkjet printing system should meet various performance parameters. These parameters may include certain physical properties of the ink such as viscosity, surface tension, and electric conductivity that work well with the discharging conditions of the inkjet print head, such as the driving voltage and driving frequency of the ink discharge means in the print head, the form and material of print head discharge orifices, the diameter of the orifices, etc. The ink should also be able to remain in storage for prolonged periods of time without causing subsequently clogging or other complications in the print head. The ink should not chemically attack, corrode or erode surrounding materials such as the ink storage container, print head components, etc. The ink should be non-toxic, flame-resistant and without any unpleasant odor. The ink should also exhibit low foaming and high pH stability characteristics.

The ink should be quickly fixable onto a print medium such that an image formed appears smooth without revealing the individual drops of ink used to form the image. Once formed into the desired image on the print medium, the ink should have strong water resistance and light resistance, meaning that the image will resist being degraded by exposure to either moisture or strong light. The ink of the printed image should also have high adhesion to the print medium and be resistant mechanical damage such as scratching.

In order to promote these desirable characteristics of an inkjet ink, specifically, a pigment-based ink, it has been suggested to encapsulate the colorant particles in a pigment-based ink. However, previous attempts to encapsulate colorant particles in a pigment-based inkjet ink so as to promote desired ink characteristics without otherwise degrading the ink's performance have met with very limited success.

SUMMARY

A method of preparing an ink includes homogenizing a dispersion to coat pigment particles in the dispersion with a monomer. An ink for use in a printing device includes pigment particles encapsulated in a polymerized monomer, where the monomer has a polarity that is higher than a polarity of a surface of the pigment particles.

BRIEF DESCRIPTION OF THE DRAWINGS

The accompanying drawings illustrate various embodiments of the present invention and are a part of the specification. The illustrated embodiments are merely examples of the present invention and do not limit the scope of the claims.

Throughout the drawings, identical reference numbers designate similar, but not necessarily identical, elements.

DETAILED DESCRIPTION

The micro-encapsulation of pigment particles or colorant particles in a pigment-based ink has been of great interest for a long time because of the large potential improvement in the performance characteristics of an ink bearing successfully-encapsulated colorant particles. The encapsulation of pigment or colorant particles has also been broadly recognized as a potential means of simplifying ink formulation. The challenge has been to find a practical and relatively general method to encapsulate various pigment particles with excellent colloidal stability, high monomer conversion, high encapsulation efficiency, minimum free polymer remaining after encapsulation, and flexibility to vary polymer types and ratios.

The present specification describes a practical method of encapsulating colorant particles in a pigment-based inkjet ink by polymerization that meets the desired criteria. The polymerization process described will significantly improve the performance characteristics of the ink, particularly the smudge and water resistance of the ink once the ink is used to form a printed image on a print medium.

Figure 1:
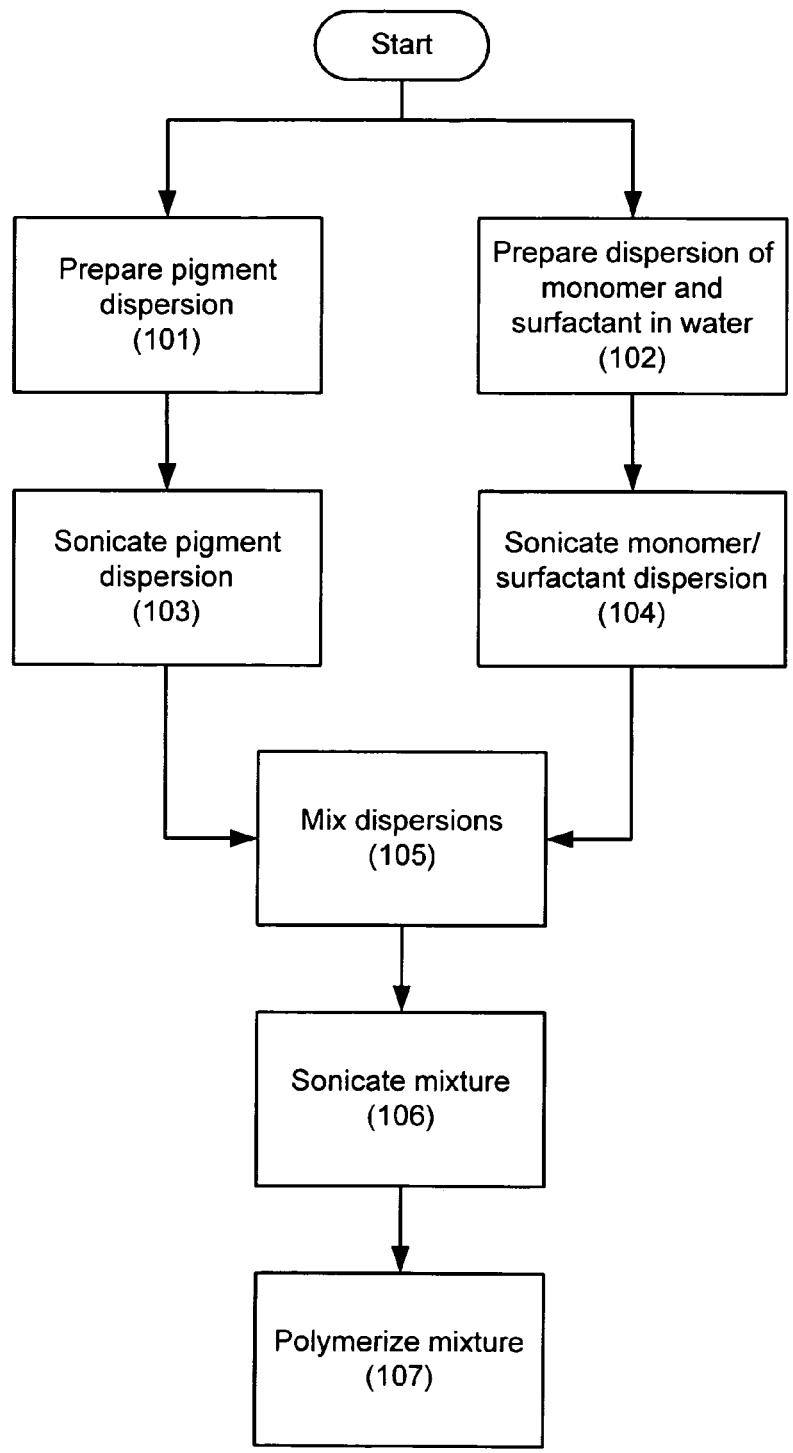
FIG. 1 is a flowchart illustrated a method of encapsulating pigment particles according to principles described herein.

A practical mini-emulsion process that has successfully encapsulated a full range of pigment particles, for example, yellow, cyan, and magenta pigment particles will now be described with reference to the figures. Referring to FIG. 1, an exemplary polymerization process includes the following steps.

First, a pigment or colorant dispersion is prepared (step 101). A second dispersion of at least one monomer and a surfactant in water is prepared separately (step 102). The monomer may be, for example, any acrylic, vinyl acetate, styrene or other monomer that contains polymerizable double bonds. The surfactant may be one or more surfactants that include, for example, sodium dodecyl sulphate (SDS), dioctyl sodium sulfosuccinate (Aerosol OT), ABEX® (anionic surfactant), other anionic surfactants and any polymerizable surfactants.

Once prepared, the pigment dispersion is homogenized (step 103). This homogenization may be performed by any method of adding energy to the dispersion so as to homogenize the dispersion. In one particular example, the homogenization is achieved by sonication. As used herein and in the appended claims, the term "sonicate" will be understood to mean a process of exposing a suspension to the disruptive effect of the energy of high frequency sound waves. In addition to sonication, any other high-energy homogenization method, such as a microfluidizer and similar devices, may be used to agitate and/or homogenize the dispersion. The second dispersion of monomer and surfactant in water is also homogenized separately from the pigment dispersion (step 104). Both of the two separate dispersions are homogenized for a period of time, for example, two minutes. The homogenization will form fine droplets in both the pigment dispersion and the monomer pre-emulsion.

After the initial separate homogenization, the two dispersions are mixed (step 105). After the dispersions are mixed, the mixture is again homogenized, e.g., sonicated, (step 106). This second round of homogenization may also be, for example, two minutes in duration. The second round of homogenization (e.g., sonication) produces microcapsules of pigment surrounded by monomer.

After the mixture has been homogenized, the mixture is polymerized (step 107) to encapsulate the pigment or colorant particles in the mixed dispersion. The mixture may be polymerized, for example, with potassium persulfate solution (KPS) and/or other persulfates or commonly used initiators including water insoluble examples.

This process will produce an ink with encapsulated pigment or colorant particles that resists smudging and water damage while forming high quality printed images.

Figure 2:
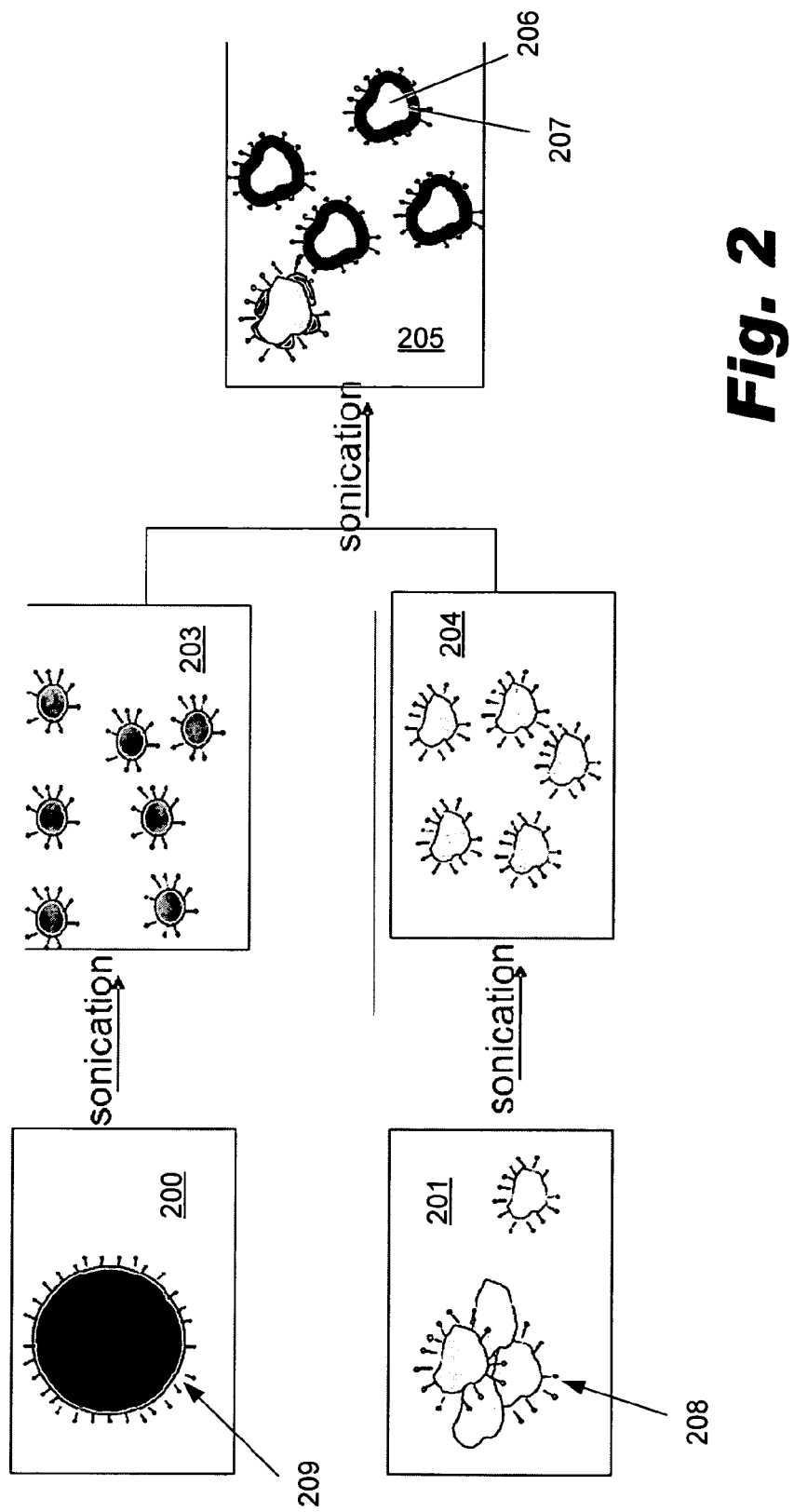
FIG. 2 is an illustration of the dispersions used in the method of FIG. 1 at various stages of the method according to principles described herein.

The process is further illustrated in FIG. 2. As shown in FIG. 2, the monomer pre-emulsion (200) is characterized with relatively large drops of monomer existing in suspension. For example, the monomer droplets may be greater in size than 10 µm. A surfactant system (209) may also be used in the dispersion (200). The presence of the surfactant (209) is illustrated at each stage of the process shown in FIG. 2.

In the pigment dispersion (201), the pigment particles are, for example, 40-200 nm in size. Moreover, the pigment particles may tend to agglomerate in the dispersion as illustrated. Again, a surfactant system (208) may be used in the dispersion (201) and is illustrated at each stage of the process shown in FIG. 2.

The first homogenization of the monomer dispersion (200) serves to break down the relatively large monomer drops into much smaller droplets (203). The smaller droplets may be, for example, 50-200 nm in size. The first homogenization of the pigment dispersion (201) serves to separate any agglomeration of pigment particles to homogenize the dispersion (204).

As described above, the two dispersions are then mixed and subjected to a second round of homogenization. This second homogenization serves to coat the monomer (207) on pigment particles (206) as shown in the suspension (205) of FIG. 2. The earlier round of homogenization, in which the monomer drops are broken down and dispersed and any agglomeration of pigment particles is broken up, facilitates this subsequent coating of the monomer (207) on to the pigment particles (207). The mixture (205) is then ready for polymerization as described, in which the monomer (207) is cross-linked to encapsulate in polymer the pigment particles (206).

Given an in situ emulsion polymerization with pigments and monomers, there are many different possible morphologies. The encapsulation morphology shown in FIG. 2, in which central pigment particles are surrounded by polymer, is just one possibility. To produce a desired encapsulation morphology, the minimum interfacial energy principle should be satisfied. This will result in formulations that are thermodynamically stable. Consequently, there are some selection criteria for monomers and surfactants, as well as pigment surfaces.

The polarity of the monomer composition used is higher than that of the surface of the pigment or colorant particles. This is so that the interfacial energy between the polymer and water can be reduced. Non-polar monomers, such as styrene, were found to be not suitable for some pigment encapsulations.

The interfacial energy principle may be stated mathematically as follows:

$$Y_{pig/water} > Y_{m/water} + Y_{pig/M}$$

Additionally, if a surfactant is used in the pigment dispersion, it should match the surfactant system used in the monomer dispersion. The result is an encapsulated morphology having a minimum interfacial energy and being, therefore, in the most thermodynamically stable form.

A few experiments will now be described demonstrating the foregoing principles. Encapsulations with more polar monomers, such as methyl methacrylate, n-butyl acrylate and their mixtures have been highly and consistently successful. With another very non-polar pigment, e.g., a Yellow dispersion, all the monomers, styrene and acrylics, can be encapsulated onto the pigment surface.

EXAMPLE 1

In a 150 ml beaker, 50 grams of Magenta E-SDS dispersion and 50.0 g of water were mixed. The mixture was sonicated at full power for 2 minutes. In a separate 150 ml beaker, 6.0 gram of methyl methacrylate (MMA), 2.0 g of butyl acrylate (BA), 0.1 g of methacrylic acid (MM), 0.5 g of hexadecane, 8.0 g of 10% aqueous SDS solution, and 83.5 g of water were mixed. This second mixture was also subject to sonicated for 2 minutes at full power to create monomer miniemulsion.

The sonicated pigment dispersion and monomer miniemulsion were then mixed together, and the full mixture was again sonicated for 2 minutes. The resulting mixture was charged into a 500 ml reactor equipped with an agitator and a condenser. 0.2 g of initiator potassium persulfate and 0.95 g of dioctyl sodium sulfosuccinate (Aerosol OT) were then also charged into the reactor. The reactor was then heated to 82° C. for 6 hours. At the completion of this process, the dispersion was cooled and filtered through a one-micro filter.

In the resulting encapsulated pigment-based ink, the monomer conversion was found about 93.7% based on solid content. Scanning electron microscopy (SEM) showed positive indication of encapsulation.

A density gradient column study revealed no free polymer presence, indicating that all the polymer was used to cover pigment particles

EXAMPLE 2

In a second example, a yellow pigment (H5G) was successfully encapsulated. Again, the in situ mini-emulsion process described herein was used with a 5% yellow pigment (H5G) dispersion and a 4% methyl methacrylate (MMA) monomer suspension. The result was a 94% conversion with no significant free polymer detected using SEM. Encapsulation was also confirmed using Tunneling Electron Microscopy (TEM) and capillary electrophoresis.

EXAMPLE 3

In a third example with the yellow pigment (H5G), a 5% monomer dispersion was used including three different monomers, methyl methacrylate (MMA), butyl acrylate (BA), and methacrylic acid (MM). The result was a 95% conversion with no significant free polymer detected using SEM. Encapsulation was also confirmed using Tunneling Electron Microscopy (TEM) and capillary electrophoresis.

EXAMPLE 4

In a fourth example, a cyan pigment was successfully encapsulated. The in situ mini-emulsion process described herein was used with a 10% cyan pigment dispersion and a 10% hydroxyl ethlyacrylate (HEA) latex monomer dispersion. The result was a stable dispersion with complete encapsulation of the pigment particles. Encapsulation was confirmed using SEM, TEM and capillary electrophoresis.

To generalize these examples, the follow monomers have been successfully used to encapsulate Yellow E-SDS pigment particles: styrene, 4-methyl styrene, MMA, BA, hydroxyethyl methacrylate (HEMA) and HEA. The following monomers have been successfully used to encapsulate Magenta E-SDS pigment particles: MMA, BA, HEMA and HEA. The following monomers have been successfully used to encapsulate Cyan E-ST pigment particles: HEMA and HEA. These results are due to the relative polarity between the monomer and the surface the of pigment particle being encapsulated.

Conversion rates were generally greater than 90%. Free polymer presence as determined by SEM was generally less than 5%. The products showed good colloidal stability and were printable with satisfactory image quality.

The process described herein may also be implemented as a seeded semi-continuous or semi-batched process. In such an implementation, the pigment particles in dispersion are placed in a reactor and act as seeds. An initiator then feeds the monomer pre-emulsion dispersion into the reactor. Homogenization, e.g., sonication, is performed as described herein to coat the pigment particles appropriately with monomer prior to polymerization.

As noted herein, pigment based ink has traditionally been known for good optical density and light resistance, but has had difficulties with poor smudge resistance and water resistance. By covering the pigment particles with polymers according to the processes described herein, the resulting ink will offer great improvement in smudge and water resistance while retaining its other traditional advantages.

Additionally, there are many other issues with a pigment dispersion such as dispersability, settling, and compatibility with other components in ink formulations. Encapsulation of the pigment particles with a polymer layer allows complete control of the surface chemistry of the particle and, consequently, control over film formation properties.

The process described herein is generic to many ink formulations. The mini-emulsion process is very clean, allowing variation in the types and amounts of monomers used. Any pigment colors can be encapsulated. The resulting inks are printable with high quality results and also demonstrate great durability.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A method of preparing an ink, said method comprising sonicating a first dispersion comprising at least one monomer prior to an introduction of pigment particles to be encapsulated in a polymerization of said at least one monomer.

2. The method of claim 1, comprising separately sonicating a second dispersion comprising said pigment particles sufficient to separate agglomeration of said pigment particles.

3. The method of claim 2, further comprising:
mixing said first and second dispersions; and
further sonicating the mixture of said first and second dispersions in which said sonicating causing coating of said pigment particles with said monomer.

4. The method of claim 3, further comprising polymerizing said mixture of said first and second dispersions to encapsulate the pigment particles.

5. The method of claim 1, further comprising polymerizing the monomer to encapsulate the pigment particles.

6. The method of claim 5, wherein said polymerizing is performed with potassium persulfate solution.

7. The method of claim 1, further comprising adding a surfactant to said dispersion.

8. The method of claim 2, further comprising adding a surfactant to said first dispersion.

9. The method of claim 2 further comprising adding a surfactant to said second dispersion.

10. The method of claim 1, wherein said at least one monomer comprises an acrylic, vinyl acetate, styrene or other monomer that contains polymerizable double bonds.

11. A method of encapsulating pigment particles for use in an ink, said method comprising:
separately homogenizing a first dispersion comprising said pigment particles and a second dispersion containing at least one monomer;
mixing said first and second dispersions;
further homogenizing the mixture of said first and second dispersions to coat said pigment particles with said at least one monomer;
polymerizing said mixture of said first and second dispersions to encapsulate said pigment particles;
configuring said ink to be dispensed from an inkjet print head; and
loading said ink into an ink storage container of an inkjet print head.

12. The method of claim 11, wherein said polymerizing is performed with potassium persulfate solution.

13. The method of claim 11, further comprising adding a surfactant to said first dispersion.

14. The method of claim 11, further comprising adding a surfactant to said second dispersion.

15. The method of claim 11, wherein said at least one monomer comprises an acrylic, vinyl acetate, styrene or other monomer that contains polymerizable double bonds.

16. The method of claim 11, wherein said dispersions of pigment particles and at least one monomer are processed through a semi-continuous, semi-batch process to produce encapsulated pigment particles for use in said ink.

17. The method of claim 16, further comprising:
seeding said dispersion of pigment particles into a reactor; and
feeding said dispersion of at least one monomer into said reactor with an initiator.

18. The method of claim 1, in which said sonicating said first dispersion is performed for two minutes.

19. The method of claim 2, in which said sonicating said second dispersion is performed for two minutes.

20. The method of claim 3, in which said sonicating said mixture is performed for two minutes.

* * * * *